(12) United States Patent  
Chu et al.

(10) Patent No.: US 9,378,293 B2  
(45) Date of Patent: Jun. 28, 2016

(54) METHOD AND APPARATUS TO AUTHOR AND MANAGE PAGES OF A WEBSITE

(75) Inventors: Peter Zhe Chu, San Jose, CA (US); Kenneth Chao-kang Chu, Saratoga, CA (US); Rajal Rasik Shah, Fremont, CA (US); Jun Zhang, Pleasanton, CA (US); Jeffrey David Meyer, Sunnyvale, CA (US); Ilya Alexandrovich Izrailevsky, Foster City, CA (US); Benjamin Gregg Listwon, Palo Alto, CA (US); Patrick Andre Blanc, Sunnyvale, CA (US)

(73) Assignee: PAYPAL, INC., San Jose, CA (US)

( * ) Notice: Subject to any disclaimer, the term of this patent is extended or adjusted under 35 U.S.C. 154(b) by 1900 days.

(21) Appl. No.: 11/145,510

(22) Filed: Jun. 3, 2005

(65) Prior Publication Data

US 2005/0273707 A1     Dec. 8, 2005

Related U.S. Application Data

(60) Provisional application No. 60/576,978, filed on Jun. 3, 2004.

(51) Int. Cl.
| | | |
|---|---|---|
| *G06F 17/00* | (2006.01) | |
| *G06F 17/30* | (2006.01) | |
| *G06F 17/22* | (2006.01) | |
| *G06F 17/27* | (2006.01) | |

(52) U.S. Cl.
CPC .......... *G06F 17/3089* (2013.01); *G06F 17/227* (2013.01); *G06F 17/2247* (2013.01); *G06F 17/2725* (2013.01)

(58) Field of Classification Search
USPC .............................. 715/500.1, 513, 237, 762
See application file for complete search history.

(56) References Cited

U.S. PATENT DOCUMENTS

| | | | |
|---|---|---|---|
| 6,342,907 B1 * | 1/2002 | Petty et al. | 715/762 |
| 6,748,569 B1 * | 6/2004 | Brooke et al. | 715/523 |
| 6,908,034 B2 * | 6/2005 | Alleshouse | 235/432 |
| 7,111,233 B1 * | 9/2006 | Ballantyne et al. | 715/215 |
| 7,461,337 B2 * | 12/2008 | Lection et al. | 715/237 |
| 7,464,331 B2 * | 12/2008 | Patch et al. | 715/237 |
| 2004/0267803 A1 * | 12/2004 | Zhou et al. | 707/102 |

\* cited by examiner

*Primary Examiner* — M. D. Ell

(74) *Attorney, Agent, or Firm* — Haynes and Boone, LLP

(57) ABSTRACT

Systems and methods provide a mechanism to create and maintain web pages and other types of output pages. The system and methods use an author markup language (AML) to define output pages. Additionally, a Component Markup Language (CML) may be used to define components that may be referenced by the AML. The AML and CML may be translated to an intermediate format, which may then be further processed at runtime to combine dynamic data with the intermediate format to produce the output page.

27 Claims, 8 Drawing Sheets

METHOD AND APPARATUS TO AUTHOR AND MANAGE PAGES OF A WEBSITE

RELATED APPLICATIONS

This application claims the benefit of U.S. Provisional Patent Application Ser. No. 60/576,978 filed Jun. 3, 2004 and entitled "METHOD AND APPARATUS TO AUTHOR AND MANAGE PAGES OF A WEBSITE" which is hereby incorporated by reference herein for all purposes.

FIELD

The embodiments relate generally to web page creation and more particularly to systems and methods for authoring web pages according to a predefined schema.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND

Since its inception, the World-Wide Web ("Web") has continuously grown to include literally billions of pages of information. Web pages typically comprise HTML (HyperText Markup Language) text with tags indicating how the text is to be displayed on a computer screen, typically through a web browser such as Internet Explorer, Netscape Navigator, or Mozilla Firefox.

The process of authoring HTML can be cumbersome, with a typical document requiring many tags in order to specify the desired output. Additionally, there are typically many tags to choose from. Further, errors in formatting the HTML can be hard to detect, because there is typically no validation performed for HTML.

XML (eXtensible Markup Language) and XSL (eXtensible Style Language) have been used to assist in defining web pages. However, it is still difficult to validate XML and XSL files without actually attempting to render the XML and XSL on a display screen. As a result, problems with HTML, XML and XSL are typically found later in the design process rather than earlier when it may be easier and more economical to fix them.

Additionally, an entity may desire to maintain a consistent look and feel across a set of many web pages, while also requiring the ability to insert dynamic content, that is, content that may change from one request for a page to the next request for the same page. For example, a company may desire to provide a consistent set of graphics (e.g. a company logo) across a set of the company's web pages. Each of the company's web pages typically must contain code to display the set of graphics. Later, if the company desires to change the look and feel of the web site, many pages will typically need to be edited to reflect the change.

SUMMARY

The various shortcomings, disadvantages and problems above are addressed by the present invention, which will be understood by reading and studying the following specification.

Systems and methods provide a mechanism to create and maintain web pages and other types of output pages. The system and methods use an author markup language (AML) to define output pages. Additionally, a Component Markup Language (CML) may be used to define components that may be referenced by the AML. The AML and CML may be translated to an intermediate format, which may then be further processed at runtime to combine dynamic data with the intermediate format to produce the output page.

A further aspect of the systems and methods includes providing a markup language to define how text in AML and CML files may be translated.

A still further aspect of the systems and methods includes providing a markup language to define how dynamic data may be included in AML and CML files.

The present invention describes systems, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION

Figure 1A:
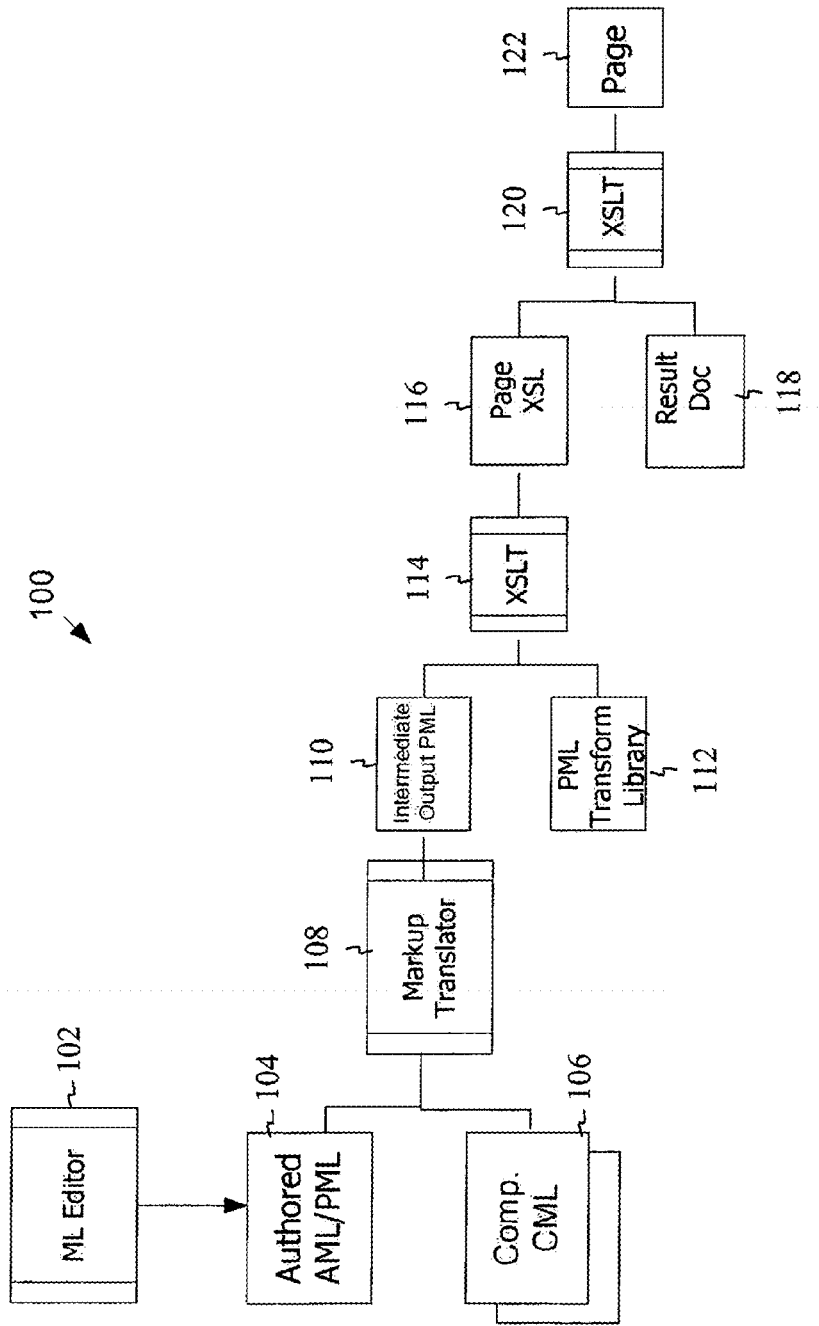
FIGS. 1A-1D are block diagrams of logical components of systems according to example embodiments.

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

The description of the various embodiments is to be construed as exemplary only and does not describe every possible instance of the invention. Numerous alternatives could be implemented, using combinations of current or future technologies, which would still fall within the scope of the claims. The following detailed description is, therefore, not to be taken in a limiting sense, and the scope of the present invention is defined only by the appended claims.

FIG. 1A is a block diagram illustrating logical components of a system 100 according to an example embodiment. In some embodiments, system 100 includes a markup language editor 102, a markup translator 108, a second translator 114, and a third translator 120.

Editor 102 comprises an editor that provides a user interface for reading, creating, updating and saving page markup language data 104. In some embodiments, editor 102 comprises the xmlspy editor, available from Altova, Inc. of Beverly, Mass. It is desirable in some embodiments to save files created by the editor in UTF-8 format. In general, page authors use the editor to create or edit author markup language (AML) and or a page markup language (PML) data that defines the contents of pages 104. In addition, a page designer may use the editor to browse for available components and validate the page document based on an author schema that defines the correct vocabulary for AML. Editor 102 may be used to validate the AML data according to a schema defining the AML vocabulary and grammar. In some embodiments, the AML schema is defined using XML. In some embodiments, PML may be used for sections of pages that are "one-offs" and do not refer to reusable components defined using CML 106.

Pages 104 comprise data that may be translated one or more times and displayed as output pages 122 on various types of devices such as computer systems running web browsers, email clients or other applications that display page output. Further, the pages 104 may be displayed on devices such as cell phones and PDAs. As noted above, in some embodiments, a page 104 is defined using AML or PML. AML in some embodiments is a superset of PML, and uses PML elements to define pages. In some embodiments, AML may also make references or calls to components, which are further described below. Further, AML in some embodiments provide control structures such as iteration (looping) and conditional execution that may not be available in the underlying PML. Additionally, in some embodiments, AML includes inline documentation that may be used to aid a user in designing a page 104 using AML.

Component markup language 106 defines the contents of components that may be used or referenced by an author when designing a page 104. Components may comprise predefined layouts that may be used on multiple pages in order to provide for consistency in page design and in order to reduce page design time by eliminating the need for each page designer to provide code for components that are used more than once. Additionally the use of components allows changes to be made across a large number of pages that refer to the component by making a change to the component itself, thereby potentially reducing the need to edit multiple AML pages 104.

A component may be referred to by its component name, and may include a set of zero or more parameters that determine the behavior of the component. In addition, a component may include a description of the functionality or behavior of the component in order to aid designer in using the component. Components designed using CML may call other components. Additionally, components may be hierarchical, i.e. a component may derive attributes and methods from a base component. Like AML, CML may be built upon PML. In some embodiments, an XML schema may be used to define the CML vocabulary and grammar.

Like AML, CML may also be validated. In some embodiments, this validation includes checking the vocabulary of the CML used to define a component and to determine that the component is "well formed", that is, does the component comply with the syntax defined by the schema.

As noted above, both AML and CML may use PML as a building block for the respective markup language. In some embodiments, PML provides control elements such as iteration and conditional logic. In some embodiments, PML may be defined using an XML schema In these embodiments, PML includes a subset of HTML rendering tags and text tags that may be supported for translation purposes. For example, in some embodiments, text that is translatable text has a unique attribute 'strId'. In addition, some embodiments may map certain PML attributes to HTML attributes. For example, PML attributes styleId and styleName correspond to HTML attributes id and class, respectively. Additionally, PML attributes styleId and styleName correspond to HTML attributes id and class, respectively.

PML portions of the AML and CML languages may be validated using the PML schema.

Table 1 below provides a list of PML elements that may be used to define AML and CML constructs:

TABLE 1

| PML Element | Description | Example |
| --- | --- | --- |
| \<Text\> | Any mixed, containing HTML text translatable into other languages. Usually occurs within \<l10n:text\> tags in MAXCODE templates. \<Text\> elements are NOT allowed inside of | \<Text strId="robot-107471-1048692487130"\>   \<Fragment\>Subscriptions &\</Fragment\>   \<LineBreak/\>   \<Fragment\>Recurring Payments\</Fragment\>   \<Style styleName="xptMyStyle"\>     \<Fragment\>Subscriptions &\</Fragment\>   \</Style\> \</Text\> |

TABLE 1-continued

| PML Element | Description | Example |
|---|---|---|
| | <Text>, as <Fragment> elements should be used. This is to have one strId for the whole <Text> <Anchor>, <Anchor>, <Image>, <Result>, <Style>, <Fragment> are allowed within. | |
| <Fragment> | Occurs only within <Text>. Represents fragments of the text, mixed with HTML tags. | `<Text strId="robot-107471-1048692487130">`<br>`  <Fragment>Subscriptions &</Fragment>`<br>`  <LineBreak/>`<br>`  <Fragment>Recurring Payments</Fragment>`<br>`</Text>` |
| <Style> | Occurs only within <Text>. Used for nested styles of text. Attribute styleName represents class. | `<Text strId="robot-107471-1048692487130">`<br>`  <Fragment>Subscriptions &</Fragment>`<br>`  <LineBreak/>`<br>`  <Style styleName="xptMyStyle">`<br>`    <Fragment>Recurring Payments</Fragment>`<br>`    <Style styleName="xptNestedStyle">`<br>`      <Fragment>Recurring Payments</Fragment>`<br>`    </Style>`<br>`    <Fragment>Subscriptions &</Fragment>`<br>`  </Style>`<br>`</Text>` |
| <Const> | Any plain text non-translatable into other languages. Used to enclose image sources, links, etc. | `<Const>/i/btn/x-click-butcc-subscribe.gif</Const>` |
| <Paragraph> | Any paragraph, containing text, mixed text, dynamic data, line breaks. | `<Paragraph>`<br>`  <Text strId="robot-1234">Message is:</Text>`<br>`  <Result>OperationStatus/Message</Result>`<br>`</Paragraph>` |
| <PreFormat> | Any pre formatted display. | `<PreFormat>`<br>`  <Result>OperationStatus/Message</Result>`<br>`</PreFormat>` |
| <Boolean> | Used to pass true/false values as parameter values to components. | `<Boolean>true</Boolean>` |
| <Result> | References to dynamic data, coming from PayPayResultDoc. | `<Result>OperationStatus/Message</Result>` |
| <Image> | Image rerefences. Standard attributes of HTML <img> are allowed (border, vspace, width, height, etc.), except for src, alt, and class. <Source> represents src, <Alt> - alt, styleName attribute - class. | `<Image hspace="0" vspace="10">`<br>`  <Source>`<br>`    <Const>/i/btn/x-click-butcc.gif</Const>`<br>`  </Source>`<br>`  <Alt>`<br>`    <Text strId="robot-107471-1048692487030">Go To My Account</Text>`<br>`  </Alt>`<br>`</Image>` |
| <ImagePixel> | Pixel image, frequently used on the current pages. Attributes border="0" alt="" are hard-coded to be such. | `<ImagePixel width="50"/>` |
| <Anchor> | Anchor references. Attribute href is represented by <Link> element. Only the CGI parameters after the "...cgi- | `<Anchor>`<br>`  <Link linkType="paypal">`<br>`    <Const>_merchant</Const>`<br>`  </Link>`<br>`  <Text strId="robot-1234">PayPal Button Factory</Text>`<br>`</Anchor>` |

TABLE 1-continued

| PML Element | Description | Example |
|---|---|---|
| | bin/webscr?cmd=" need to be inside of <Link><Const>. See the Pml.xsd for the description of possible linkType values and their meaning. | |
| <AnchoredResult> | Adds anchors to the specified dynamic ResultDoc element. | `<AnchoredResult>`<br>  `<Result>CustomerServiceDetails/Memo</Result>`<br>`</AnchoredResult>` |
| <LinkedButton> | Button linking to some URL when clicked on. | `<LinkedButton>`<br>  `<Link linkType="paypal">`<br>    `<Const>_account</Const>`<br>  `</Link>`<br>  `<Name>`<br>    `<Const>Go To My Account</Const>`<br>  `</Name>`<br>  `<Value>`<br>    `<Text strId="CEdit-hdoan-1071263553590">Go To My Account</Text>`<br>  `</Value>`<br>`</LinkedButton>` |
| <List> | Bulleted list of text items. | `<List>`<br>  `<Item>`<br>    `<Text strId="clickthru-keep_payments_free-007">Both the buyer and the seller must reside in the UK</Text>`<br>  `</Item>`<br>  `<Item>`<br>    `<Text strId="clickthru-keep_payments_free-008">The purchase price must be in Pounds Sterling</Text>`<br>  `</Item>`<br>  `<Item>`<br>    `<Text strId="clickthru-keep_payments_free-010">`<br>      `<Fragment>The seller must not charge you more than the fees they are charged by PayPal. (These fees are at most </Fragment>`<br>      `<Fragment> on transactions within the UK)</Fragment>`<br>    `</Text>`<br>  `</Item>`<br>`</List>` |
| <LineBreak> | Line break. | `<LineBreak/>` |
| <Choose> | Conditionals based on dynamic values coming from ResultDoc. | `<Choose>`<br>  `<Choice when="UserProperties/FlagLoggedIn and PageProcessingInfo/Country = 'US'">`<br>    `<Text strId="robot-0001">You are from the United States.</Text>`<br>  `</Choice>`<br>  `<Choice when="UserProperties/FlagLoggedIn and PageProcessingInfo/Country = 'DE'">`<br>    `<Text strId="robot-0002">You are from Germany.</Text>;`<br>  `</Choice>;`<br>  `<Otherwise>;`<br>    `<Text strId="robot-0003">You are a citizen of the world.</Text>;`<br>  `</Otherwise>;`<br>`<Choose>` |
| <Table> | Represents an HTML table. Most of the attributes of <table> (width, cellpadding, cellspacing, etc.), except for class. Attribute styleName represents class. | `<Table cellspacing="3">`<br>  `<TableRow>`<br>    `<TableCell align="center">`<br>    ...<br>    `</TableCell>`<br>  `</TableRow>`<br>`</Table>` |
| <TableRow> | Represents an HTML table row. Most of the attributes of <table> (valign, background, bgcolor, etc.), except for class. | `<TableRow>`<br>  `<TableCell align="center">`<br>  ...<br>  `</TableCell>`<br>`</TableRow>` |

TABLE 1-continued

| PML Element | Description | Example |
|---|---|---|
| <TableCell> | Attribute styleName represents class. Represents an HTML table cell. Most of the attributes of <table> (width, valign, rowspan, etc.), except for class. Attribute styleName represents class. | <TableCell align="center"><br>  <Image hspace="0" vspace="10"><br>  ...<br>  </Image><br></TableCell> |
| <Container> | Represents an HTML <div>. Attribute styleId represents id, styleName - class. | <Container styleId="xptMessageBox"><br>  <Table align="center"><br>  ...<br>  </Table><br></Container> |
| <SeparationLine> | Represents a horizontal rule. | <SeparationLine styleName="medium"/> |
| <Money> | Formats a money amount with given currency for a given locale. | <Money currency="GBP">20</Money> |
| <NumberPercent> | Formats a percentage number for a given locale. | <NumberPercent>10</NumberPercent> |
| <Form> | Represents a form on a page. | <Form><br>  <FormAction>...</FormAction><br>  <FormBody><InputSubmit><InputButton><br>  </FormBody><br></Form> |
| <InputText> | Input text. | <InputText><Name><Value></InputText> |
| <InputTextArea> | Input text area. | <InputTextArea><Name><Value></InputTextArea> |
| <InputHidden> | Input hidden. | <InputHidden><Name><Value></InputHidden> |
| <InputPassword> | Input password. | <InputPassword><Name><Value></InputPassword> |
| <InputButton> | Input button. | <InputButton><Name><Value></InputButton> |
| <InputLabel> | Input text. | <InputLabel><Label></InputLabel> |
| <InputSubmit> | Input text. | <InputSubmit><Name><Value></InputSubmit> |
| <InputCheckbox> | Input checkbox. | <InputCheckbox><Name><Value></InputCheckbox> |
| <InputRadio> | Input radio. | <InputRadio><Name><Value></InputRadio> |
| <InputSelect> | Input select. | <InputSelect><Name><OptionList></InputSelect> |
| <InputOption> | Input option. | <InputOption><Name><Value></InputOption> |
| <InputImage> | Input image. | <InputImage><Name><Value></InputImage> |

Translator 108 reads AML pages 104 and CML 106 to produce intermediate output PML 110. In some embodiments, translator 110 comprises software that replaces component calls with the instances of the components. In addition, translator 108 may also set the parameters using values from component callers. The resulting intermediate output PML 110 file is a PML document that does not have any component references.

Translator 114 reads intermediate output PML 110 to produce page XSL 116. In some embodiments, translator 114 reads a set of one or more XSL files in PML transform library 112 that transforms intermediate output PML 110 into HTML and XSL equivalent in page XSL 116. For example, elements for markup of content can be transformed into HTML, while programming constructs such as conditionals and iterations can be mapped to XSL elements. In some embodiments, the XSL script in page XSL 116 may include XSL code that processes dynamic data. In some embodiments, page XSL 116 may be deployed to a server to be used at runtime.

Translator 120 reads page XSL 116 and results doc 118 to produce output page 122. In some embodiments, results doc 118 comprises dynamic content. Dynamic content includes content that cannot be defined at build time, rather it is provided at run-time. Examples of such dynamic content include personalization data (e.g. name, address, demographic data etc.) regarding a page requestor, account balances, and other data that either differs from user to user or changes over time. The dynamic content may include parameters upon which components CML 106 and AML pages 104 use as a basis for dynamic logic defined in the AML or CML.

In some embodiments, output page 122 may be HTML that may be displayed on a web browser or in an HTML compatible electronic mail message. In alternative embodiments, translator 120 may produce an output page in a format that may be displayed on a PDA, cell phone or other device. The embodiments of the invention are not limited to a particular format for output page 122.

Figure 1B:
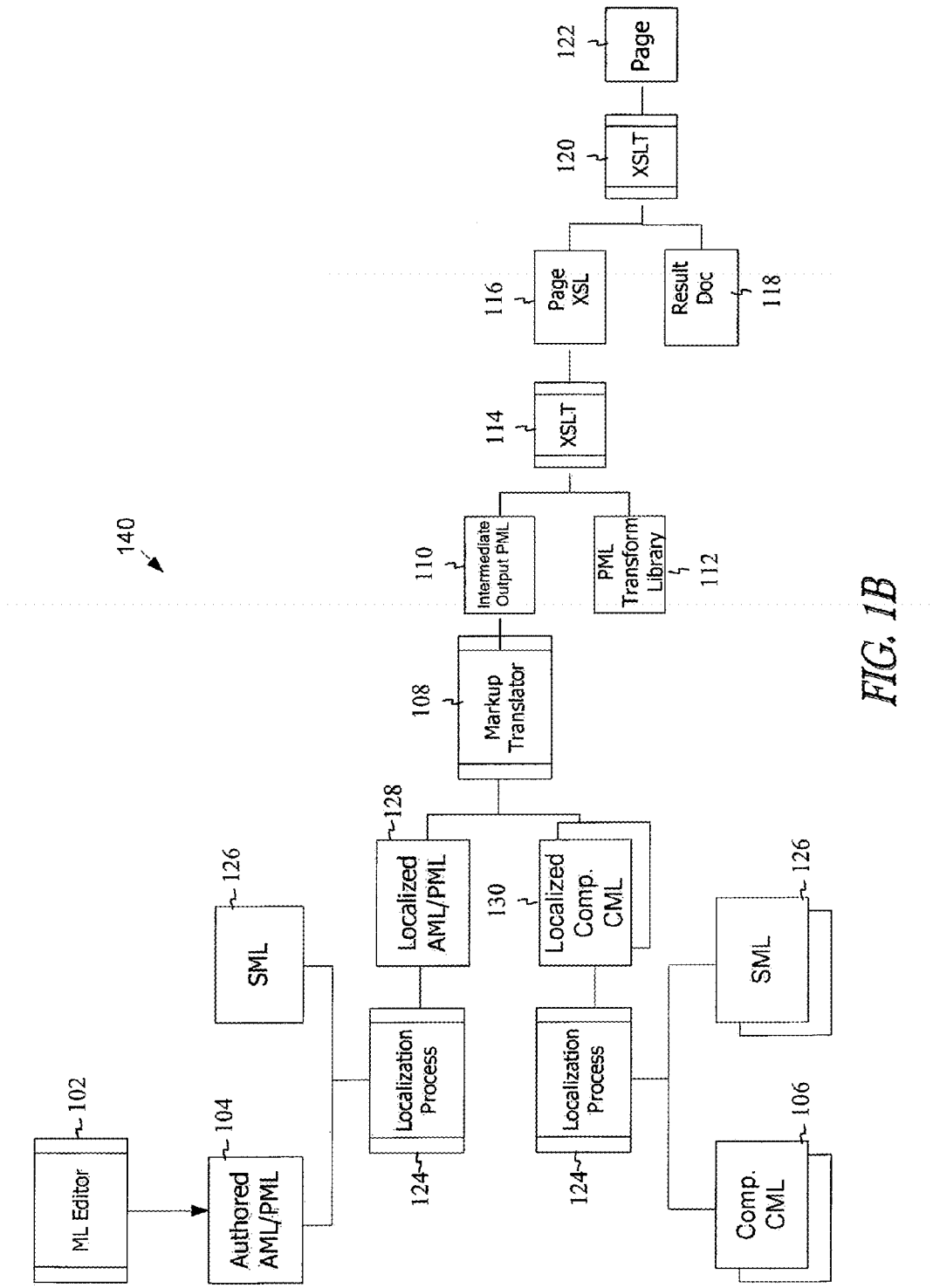

FIG. 1B is a block diagram illustrating logical components of a system 140 according to a further example embodiment. In general, system 140 includes the components of system 100 described above. In addition, system 140 includes one or more localization processes 124 that may be used to translate AML 104 and CML 106 to localized AML 128 and localized CML 130 respectively. The localized files comprise files in which one or more text strings in the source AML 104 and CML 106 have been translated from a source language into a differing target language used in a particular locality. For example, English text may be translated into German text for a user in Germany, and Spanish text for a user in Spain. The localized versions of AML 104 and CML 106 are then processed as described above. In some embodiments, localization process 124 is a script that extracts translatable text from the authored AML 104 and CML 106, and inserts the translated text into localized versions of AML 128 and CML 130.

In some embodiments, an SML (String Markup Language) file 126 is used to control how translations are accomplished. The SML file may contain the rules and tags that define which text is translated and which text is not. In some embodiments, the SML file conforms to an XML schema In some embodiments, an SML file 126 exists for each AML 104 or CML 106 file. In alternative embodiments, a single SML file 126 may be applied to one or more AML or CML files.

Figure 1C:
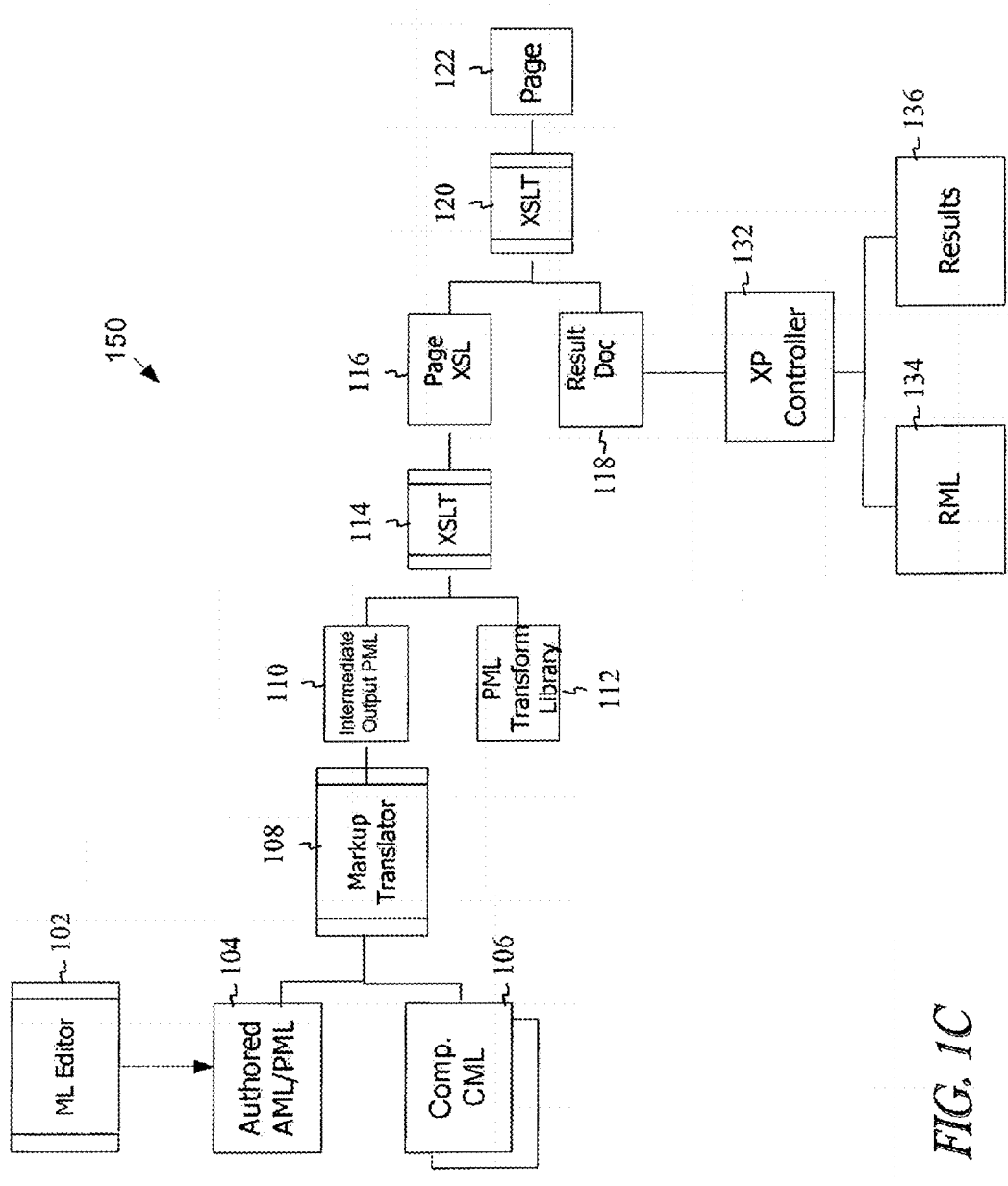

FIG. 1C is a block diagram illustrating logical components of a system 150 according to a still further example embodiment. In general, system 150 includes the components of system 100 described above. In addition, system 150 includes an XP controller process that reads results 136 and RML 134 to produce result doc 118. Results 136 comprises raw (i.e. unformatted) data that is returned as a result of a user request. RML 134 comprises a schema that determines how results 136 may be translated into a results doc 118. In some embodiments, RML 134 conforms to an XML schema.

Figure 1D:
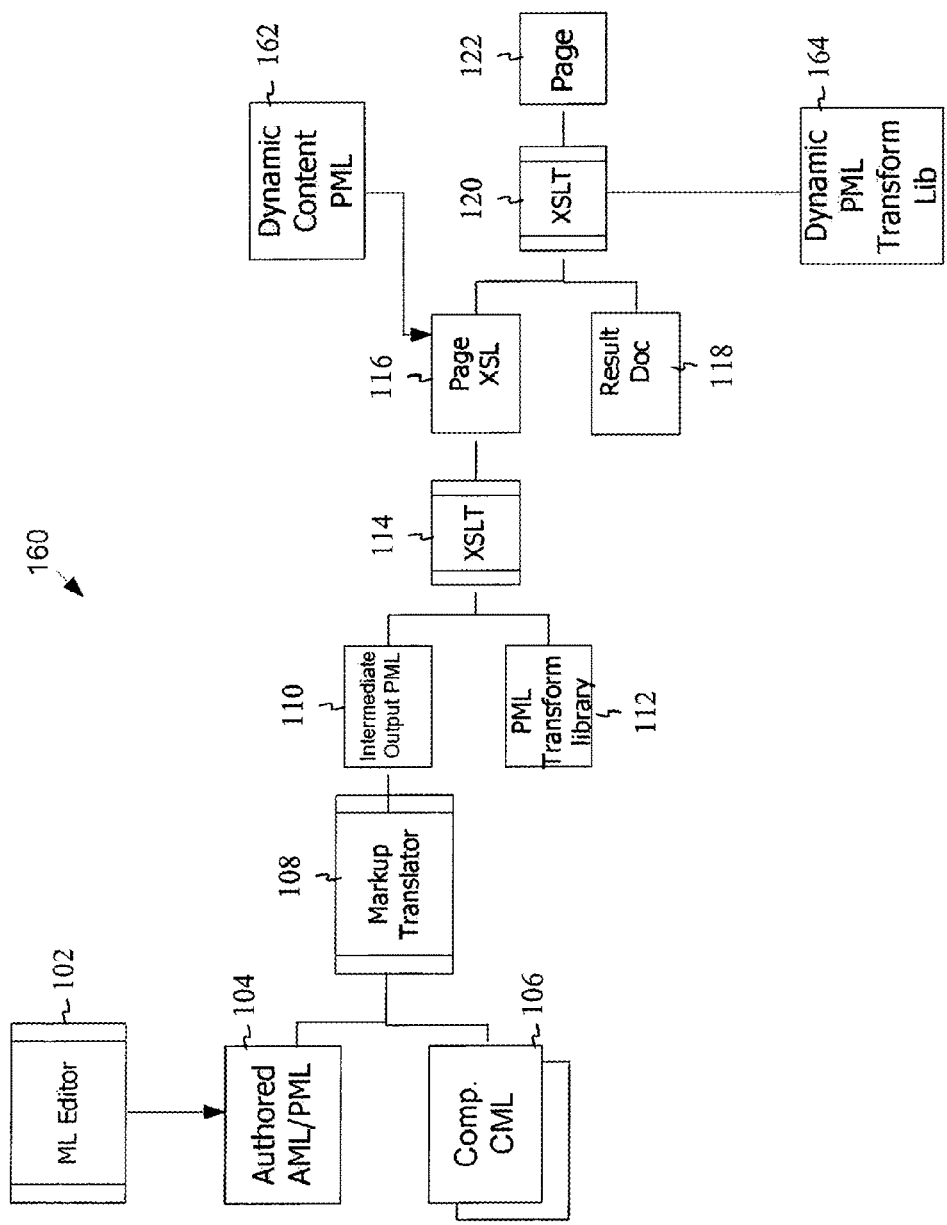

FIG. 1D is a block diagram illustrating logical components of a system 160 according to a yet further example embodiment. In general, system 160 includes the components of system 100 described above. In addition, system 160 includes dynamic content PML 162 and dynamic PML transform library 164. Dynamic content PML 162 comprises data that may be authored similar to AML data 104. Dynamic content PML 162 typically contains content that may change over time, but not as rapidly as content in result doc 118. For example, dynamic content PML may comprise a user agreement for use of a web site. Such user agreements may vary from country to country, and in addition the terms of the user agreement may change over time, necessitating a change in the dynamic PML content 162. Such changes can be made without retranslating AML data 104 that may use directives to include dynamic PML content 162 in later transformations.

In some embodiments, dynamic PML transform library 164 comprises a set of one or more XSL files that may be read by translator 120 to transforms dynamic content PML 162 along with page XSL 116 to output page 122. In some embodiments, dynamic PML transform library 164 is a subset of PML transform library 112.

It should be noted that various embodiments may include various combinations of some or all of the elements described above in FIGS. 1A-1D.

Figure 2:
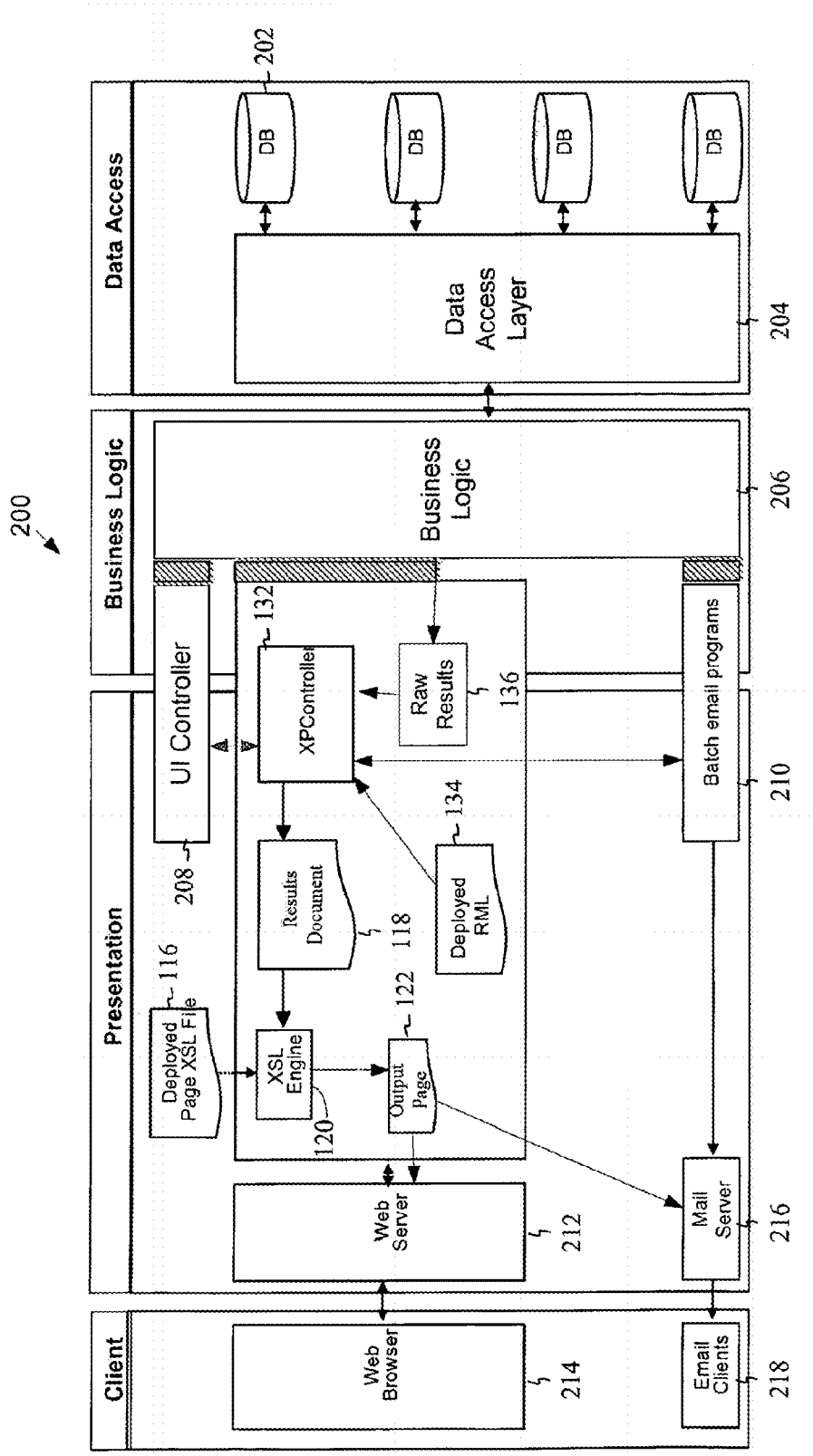
FIG. 2 is a block diagram further illustrating runtime system components according to an example embodiment.

FIG. 2 is a block diagram illustrating further runtime system 200 components according to an example embodiment. In some embodiments system 200 includes database 202, data access layer 204, business logic 206, UI controller 208, XP controller 132, web server 212 and web client 214. Database 202 may be used to store dynamic content 202. For example, database 202 may store user data, including name, demographic data, account data, financial data, and other data that is either associated with an account or user, and/or data that may change over time. Data access layer 204 provides an interface to database 202. The data access layer may be provided as part of a database management system, or it may be an standardized data access layer such as ODBC.

Business logic 206 comprises software that may be used to perform functions such as updating account information, moving funds from one account to another, or paying funds from an account to a payee.

UI controller 208 serves as an entry point for a page request received from a web browser 214 through web server 212. UI controller 208 executes business logic functions 206, and in some embodiments calls XP controller 132, which coordinates the construction of dynamic results 136 and results document 118. XSL engine 120 may then read the results document 118 and page XSL file 116 to produce the output page 122. As noted above, output page 122 may be an HTML formatted file, which is then passed to the web server 212 to relay to the requesting web browser 214.

In some embodiments, web server 212 is the Apache web server. However, the embodiments of the invention are not limited to any particular web server, and those of skill in the art will appreciate that any suitable web server may be used.

In some embodiments, system 200 may include one or more batch email programs 210, an email server 216, and email clients 218. In these embodiments, dynamic content read by XP controller 132 may create output that may be used by a batch email program to generate emails with dynamic content in the same manner that dynamic content may be generated for web server 212. The emails containing the dynamic content may be processed by an email server 216 for reading by email clients 218. As noted above, output page 122 may be an HTML formatted file, which may be inserted into or formatted as an electronic mail message for processing by email server 216.

In some embodiments, email server 216 comprises the qmail email server. Those of skill in the art will appreciate that any suitable email server may be substituted for the qmail server.

In the discussion above, web servers and email servers receive output of authored AML data 104 that may include dynamic content. Those of skill in the art will appreciate that other applications and servers could be adapted to use the systems and methods described herein to include authored AML data 104 and dynamic content.

Figure 3:
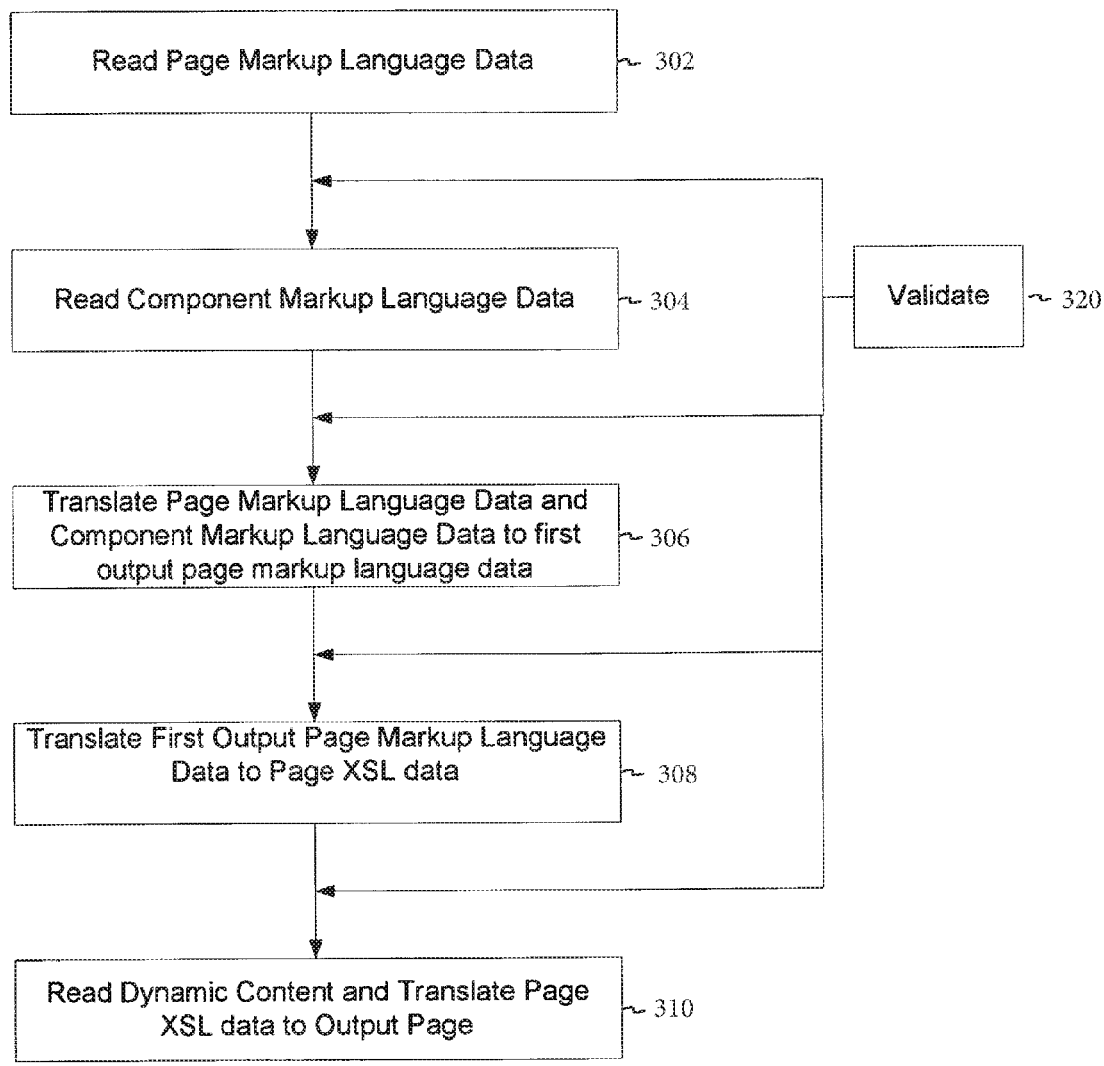
FIG. 3 is a flowchart illustrating methods according to example embodiments of the invention.

FIG. 3 is a flowchart illustrating methods for authoring and managing web pages according to embodiments of the invention. The methods to be performed by the operating environment constitute computer programs made up of computer-executable instructions. Describing the methods by reference to a flowchart enables one skilled in the art to develop such programs including such instructions to carry out the method on suitable processors for gaming machines (the processor or processors of the computer executing the instructions from computer-readable media). The methods illustrated in FIG. 3 are inclusive of acts that may be taken by an operating environment executing an exemplary embodiment of the invention.

The method begins by reading a page markup language file (block 302). Typically the page markup language file will be authored and conform to an author markup language. As noted above, the AML/PML file may include references to one or more components.

Next, the system reads component markup language data (block 304). Typically the component markup language data will conform to a component markup language.

The system then translates the page markup language data and the component markup language data into an intermediate output, referred to as first output page markup language data (block 306). In some embodiments, the translation replaces references to components with instances of the component (e.g. the PML for the component) and process any parameters associated with the component.

Next, the system translates the intermediate output to page XSL data (block 308). In some embodiments, an XSL translator may be used to perform all or part of the translation. In some embodiments, the page XSL data may be deployed, that is, made available for general use as part of a web or other type of service.

Next, the system reads dynamic content and translates the page XSL data, along with the dynamic content into an output page (block 310). In some embodiments, the dynamic content may comprise a results doc that is formed by translating raw data according to an RML (Results Markup Language) specification. The output page may be formatted in various ways in varying embodiments. For example, the output page may be an HTML page for a web browser, an email message for an email server/client, or other output page for a device such as a PDA, cell phone.

It should be noted that the various AML, PML, CML and RML files may be validated (block 320) at various points in the above process. As noted above, AML may be validated while editing, or at various points before or after the translations discussed above. In addition, references in AML files to components defined in CML files, or results defined in RML files may be validated to insure that the AML data refers to valid components and results.

Additionally, validation may take place independently of the above described process. For example, a separate validation tool that validates various combinations of AML, PML, CML and RML may be applied at any time by an AML author. Further, the validation tool may be applied when the AML, PML, CML or RML is submitted to a code repository.

It should be noted that inventive concepts may exist in subsets of the actions discussed above with reference to FIG. 3, and various embodiment of the invention may include various combinations of actions illustrated in FIG. 3.

Figure 4:
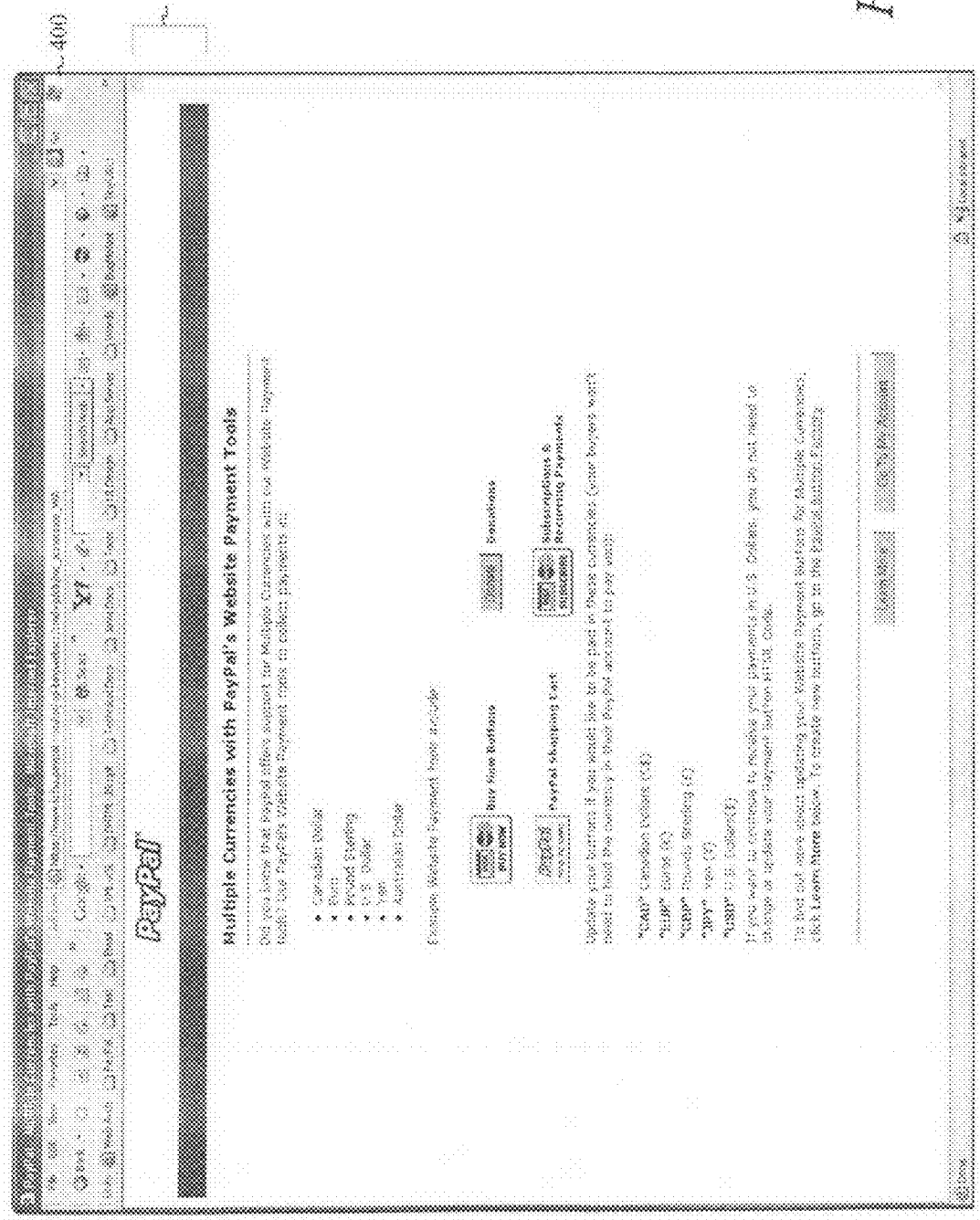
FIG. 4 is a diagram illustrating an example output page generated using embodiments of the invention.

FIG. 4 is a diagram illustrating an example output page 400 generated using embodiments of the invention. Page 400 includes content that is desirable to reuse from page to page. For example, data 402 indicating the site owner and separator bar may be reused from page to page. Markup language defining data 402 is thus suitable for implementation as a component. Other content on the page may not be suitable for reuse, and is thus more suitable for definition using AML as described above.

The following is sample AML code may be used to produce page 300:

```xml
<?xml version="1.0" encoding="UTF-8"?>
<c:Aml language="en_US" master="en_US" xmlns:d="http://www.paypal.com/Dml"
xmlns:c="http://www.paypal.com/Aml" xmlns="http://www.paypal.com/Pml"
xmlns:xsi="http://www.w3.org/2001/XMLSchema-instance"
xsi:schemaLocation="http://www.paypal.com/Aml ../../../schemas/core/aml/Aml.xsd"
masterVersion="$Id: MultipleCurrencyWA.aml,v 1.5 2004/08/23 01:01:42 ywu Exp
$">
    <c:LayoutClickthrough>
        <c:wpHeader>
            <c:wpHideLoginLinks>
                <Boolean>true</Boolean>
            </c:wpHideLoginLinks>
            <c:wpTabsJustBlueBar>
                <Boolean>true</Boolean>
            </c:wpTabsJustBlueBar>
        </c:wpHeader>
        <c:wpStandardPageTitle>
            <Text strId="robot-107471-1048692486990"><Fragment>Multiple
Currencies with PayPal's Website Payment Tools </Fragment></Text>
        </c:wpStandardPageTitle>
        <c:wpStandardContentTitle>
            <c:wpContentTitle>
                <Text strId="psrivastava-9736-1096418270-59729-
1"><Fragment>Multiple Currencies with PayPal's Website Payment Tools
</Fragment></Text>
            </c:wpContentTitle>
        </c:wpStandardContentTitle>
        <c:wpContentAreaFreeForm>
            <c:wpContent>
                <Paragraph>
                    <Text strId="robot-107471-1048692487080">
                        <Fragment>Did you know that PayPal offers support for
Multiple Currencies with our Website Payment tools? Use PayPal's Website Payment
tools to collect payments in: </Fragment>
                        <c:TextUnit>
                            <c:wpName>
                                <Const>currencies_plural</Const>
                            </c:wpName>
                        </c:TextUnit>
                        <Fragment>Example Website Payment tools
include:</Fragment>
                    </Text>
                </Paragraph>
                <Table cellspacing="3">
                    <TableRow>
                        <TableCell align="center">
                            <Image hspace="0" vspace="10">
                                <Source>
                                    <Const>/i/btn/x-click-butcc.gif</Const>
                                </Source>
                                <Alt>
                                    <Text strId="robot-107471-
```

-continued

```
1048692487030"><Fragment>Go To My Account</Fragment></Text>
          </Alt>
        </Image>
      </TableCell>
      <TableCell styleName="smallEmphasis">
        <Text strId="robot-107471-
1048692487090"><Fragment>Buy Now Buttons</Fragment></Text>
      </TableCell>
      <TableCell>
        <ImagePixel width="50"/>
      </TableCell>
      <TableCell align="center">
        <Image hspace="0">
          <Source>
            <Const>/i/btn/x-click-but11.gif</Const>
          </Source>
          <Alt>
            <Text strId="robot-107471-
1048692487040"><Fragment>PayPal Donate button</Fragment></Text>
          </Alt>
        </Image>
      </TableCell>
      <TableCell styleName="smallEmphasis">
        <Text strId="robot-107471-
1048692487100"><Fragment>Donations</Fragment></Text>
      </TableCell>
    </TableRow>
    <TableRow>
      <TableCell align="center">
        <Image hspace="0" vspace="10">
          <Source>
            <Const>/i/btn/sc-but-01.gif</Const>
          </Source>
          <Alt>
            <Text strId="robot-107471-
1048692487050"><Fragment>PayPal Add to Cart button</Fragment></Text>
          </Alt>
        </Image>
      </TableCell>
      <TableCell styleName="smallEmphasis">
        <Text.strId="robot-107471-
1048692487120"><Fragment>PayPal Shopping Cart</Fragment></Text>
      </TableCell>
      <TableCell>
        <ImagePixel width="50"/>
      </TableCell>
      <TableCell align="center">
        <Image hspace="0">
          <Source>
            <Const>/i/btn/x-click-butcc-subscribe.gif</Const>
          </Source>
          <Alt>
            <Text strId="robot-107471-
1048692487060"><Fragment>PayPal Subscriptions and Recurring Payments
button</Fragment></Text>
          </Alt>
        </Image>
      </TableCell>
      <TableCell styleName="smallEmphasis">
        <Text strId="robot-107471-1048692487130">
          <Fragment>Subscriptions &</Fragment>
          <LineBreak/>
          <Fragment>Recurring Payments</Fragment>
        </Text>
      </TableCell>
    </TableRow>
  </Table>
  <Paragraph>
    <Text strId="robot-107471-1048692487150"><Fragment>Update
your buttons if you would like to be paid in these currencies (your buyers won't need
to hold the currency in their PayPal account to pay you):</Fragment></Text>
  </Paragraph>
  <Table cellspacing="5" align="">
    <TableRow>
      <TableCell styleName="emphasis">
        <Text strId="robot-107471-
```

```
1048692487170"><Fragment>"CAD"</Fragment></Text>
      </TableCell>
      <TableCell>
        <Text strId="robot-107471-
1048692487180"><Fragment>Canadian Dollars (C$)</Fragment></Text>
      </TableCell>
    </TableRow>
    <TableRow>
      <TableCell styleName="emphasis">
        <Text strId="robot-107471-
1048692487190"><Fragment>"EUR"</Fragment></Text>
      </TableCell>
      <TableCell>
        <Text strId="robot-107471-
1048692487200"><Fragment>Euros (€)</Fragment></Text>
      </TableCell>
    </TableRow>
    <TableRow>
      <TableCell styleName="emphasis">
        <Text strId="robot-107471-
1048692487210"><Fragment>"GBP"</Fragment></Text>
      </TableCell>
      <TableCell>
        <Text strId="robot-107471-
1048692487220"><Fragment>Pounds Sterling (£)</Fragment></Text>
      </TableCell>
    </TableRow>
    <TableRow>
      <TableCell styleName="emphasis">
        <Text strId="robot-107471-
1048692487230"><Fragment>"JPY"</Fragment></Text>
      </TableCell>
      <TableCell>
        <Text strId="robot-107471-
1048692487240"><Fragment>Yen (¥)</Fragment></Text>
      </TableCell>
    </TableRow>
    <TableRow>
      <TableCell styleName="emphasis">
        <Text strId="robot-107471-
1048692487250"><Fragment>"USD"</Fragment></Text>
      </TableCell>
      <TableCell>
        <Text strId="robot-107471-
1048692487260"><Fragment>U.S. Dollars($)</Fragment></Text>
      </TableCell>
    </TableRow>
  </Table>
  <Paragraph>
    <Text strId="CEdit-107471-1048692399981">
      <Fragment>If you want to continue to receive your payments
in U.S. Dollars, you do not need to change or update your Payment Button HTML
Code.</Fragment>
      <LineBreak/>
      <LineBreak/>
      <Fragment>To find out more about updating your Website
Payment Buttons for Multiple Currencies, click </Fragment>
      <Fragment styleName="emphasis">Learn More</Fragment>
      <Fragment>below. To create new buttons, go to the
</Fragment>
      <Anchor>
        <Link linkType="paypal">
          <Const>_merchant</Const>
        </Link>
        <Fragment>PayPal Button Factory</Fragment>
      </Anchor>
      <Fragment>.</Fragment>
    </Text>
    <LineBreak/>
    <LineBreak styleName="h5"/>
  </Paragraph>
 </c:wpContent>
</c:wpContentAreaFreeForm>
<c:wpFooter>
  <c:wlpButtonList>
    <c:FormButton>
      <c:wpURL>
```

```
        <Const>p/sell/mc/mc_intro</Const>
      </c:wpURL>
      <c:wpName>
        <Const>Learn More</Const>
      </c:wpName>
      <c:wpValue>
        <Text strId="robot-107471-
1048692487020"><Fragment>Learn More</Fragment></Text>
      </c:wpValue>
    </c:FormButton>
   </c:wlpButtonList>
  </c:wpFooter>
 </c:LayoutClickthrough>
</c:Aml>
```

The above AML document will finally be converted into the following excerpted XSL script that outputs XHTML with some XSL code that deals with any dynamic data present:

```
<?xml version="1.0"?>
<xsl:stylesheet xmlns:xsl="http://www.w3.org/1999/XSL/Transform"
version="1.1">
<xsl:template match="/WebsiteResultDoc">
  <html>
    <head>
      <title>Website - Multiple Currencies with Website's
Website Payment Tools </title>
      <xsl:comment>&#13;
 Script info: script:
webscr, cmd: <xsl:value-of
select="PageProcessingInfo/Command"/>, template: <xsl:value-
of select="PageProcessingInfo/Template"/>, date: <xsl:value-of
select="PageProcessingInfo/Date"/>; country: <xsl: value-of
select="PageProcessingInfo/Country"/>, language: <xsl:value-of
select="PageProcessingInfo/Language"/>&#13;&#10;
web version: <xsl: value-of
select="PageProcessingInfo/WebVersion"/> branch: <xsl:value-
of
select="PageProcessingInfo/WebBranch"/>&#13;&#10
; content version: <xsl:value-of
select="PageProcessingInfo/ContentVersion"/>&#13;&
#10; pmlFile: pmlFile: &#13;&#10; xslFile: pmlFile
&#13;&#10;</xsl:comment>
      <meta><xsl:attribute name="http-
equiv">DESCRIPTION</xsl:attribute><xsl:attribute
name="content">Website lets you send money to anyone with
email. Website is free for consumers and works seamlessly with
your existing credit card and checking account. You can settle
debts, borrow cash, divide bills or split expenses with friends all
without going to an ATM or looking for your
checkbook.</xsl:attribute></meta>
      <meta><xsl:attribute name="http-
equiv">KEYWORDS</xsl:attribute><xsl:attribute
name="content">Send, money, payments, credit, credit card,
instant, money, financial services, mobile, wireless, WAP, cell
phones, two-way pagers, Windows CE</xsl:attribute></meta>
      <link href="/css/pp_styles_111402.css" rel="stylesheet"
type="text/css"/>
      <link href="/css/pp_table_styles.css" rel="stylesheet"
type="text/css"/>
      <link href="/en_US/i/icon/pp_favicon_x.ico"
rel="shortcut icon"/>
    </head>
    <body>
      <xsl:choose>
        <xsl:when
test="PageProperties/SiteCatalystGlobalTag">
          <img border="0" height="1"
width"1"><xsl:attributename="src">https://102.112.2O7.net/b/s
s/<xsl:value-of
select="PageProperties/SiteCatalystGlobalTag"/>/1/G.4--
NS/0?pageName=Multiple Currencies with Website's Website
```

```
Payment Tools ::<xsl:value-of
select="PageProcessingInfo/Template"/>::<xsl:value-of
select="PageProcessingInfo/Command"/>&amp;c6=<xsl:value
-of
select="UserProperties/AccountNumberExternal"/></XSL:attribute
></img>
          .....
        </xsl:when>
      </xsl:choose>
      <table class="main" align="center" border="0"
cellpadding"0" cellspacing="0">
        ......
      </table>
      .....
    </body>
  </html>
</xsl:template>
</xsl:stylesheet>
```

Figure 5:
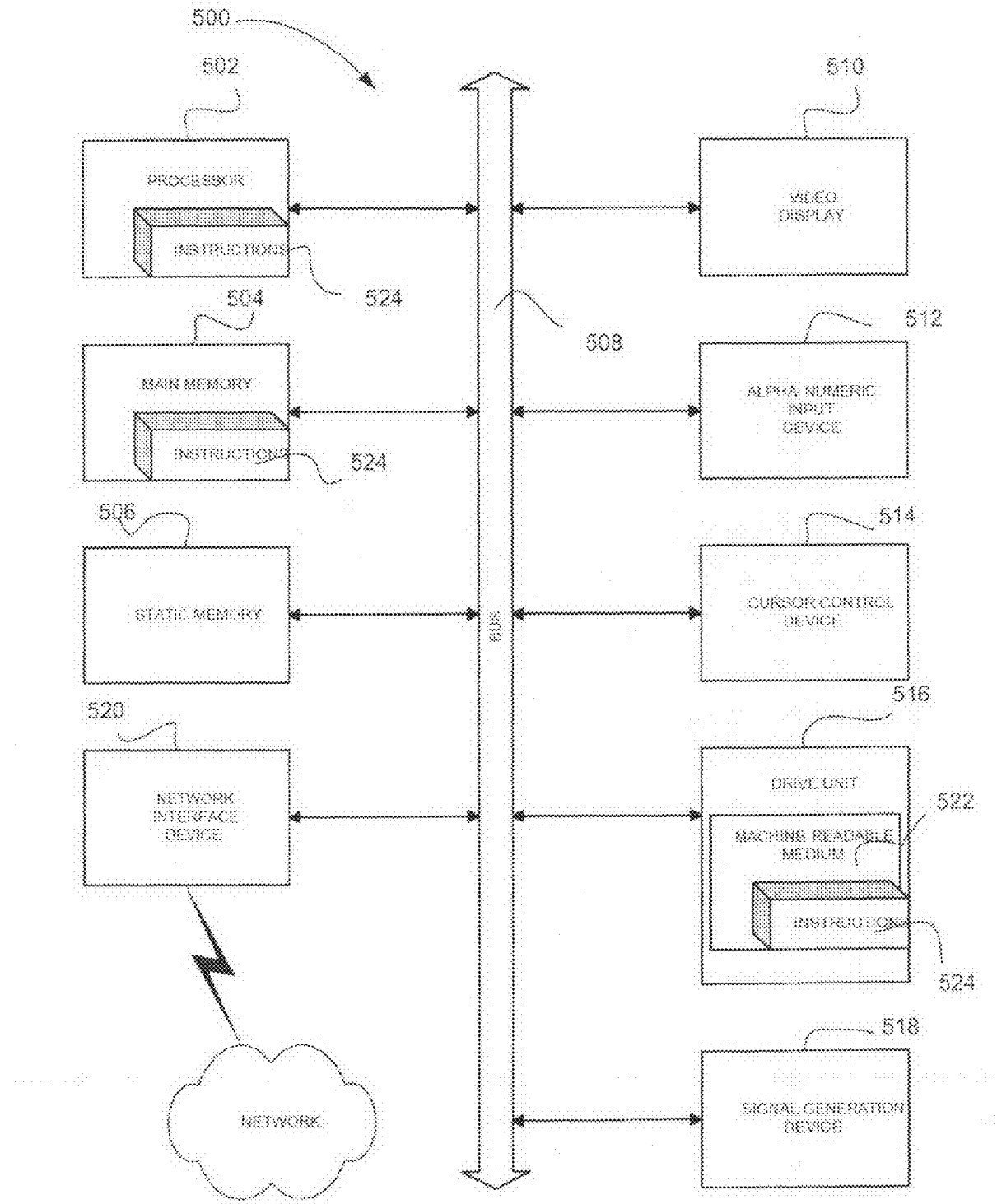
FIG. 5 is a block diagram illustrating components of a computing device that may execute systems and methods according to embodiments of the invention.

FIG. 5 is a block diagram illustrating major components of a computer system 500 within which a set of instructions, for causing the machine to perform any one or more of the methodologies discussed herein, may be executed. In alternative embodiments, the machines operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processor 502 (e.g., a central processing unit (CPU) a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a cursor control device 514 (e.g., a mouse), a disk drive unit 516, a signal generation device 518 (e.g., a speaker) and a network interface device 520.

The disk drive unit 516 includes a machine-readable medium 522 on which is stored one or more sets of instructions (e.g., software 524) embodying any one or more of the methodologies or functions described herein. The software 524 may also reside, completely or at least partially, within the main memory 504 and/or within the processor 502 during execution thereof by the computer system 500, the main memory 504 and the processor 502 also constituting machine-readable media The software 524 may further be transmitted or received over a network 526 via the network interface device 520. The network 526 may be any type of wired or wireless network and the network interface 520 may vary based on the type of network. In some embodiments, the network comprises a LAN (local area network). In alternative embodiments, the network may be a wide area network a corporate network, or an intranet linking multiple networks. In further alternative embodiments, the network may comprise the Internet.

While the machine-readable medium 522 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories and optical and magnetic media.

CONCLUSION

Thus, a method and a system to author pages, and an architecture, for a website have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. Many other embodiments will be apparent to those of skill in the art upon reviewing the above description. Therefore, it is manifestly intended that this invention be limited only by the following claims and equivalents thereof.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

What is claimed is:

1. A method for authoring an output page, the method comprising:
   reading page markup language data;
   validating the page markup language data according to a schema for the page markup language;
   presenting one or more available components defined using component markup language, the available components including pre-defined layouts of an output page;
   reading component markup language data, the component markup language data including at least one component reference from the one or more available components;
   validating the component reference in the page markup language data;
   translating the page markup language data and the component markup language data to intermediate output page markup language data;
   translating the intermediate output page markup language data to first output page markup language data;
   editing at least one component of the one or more available components, the at least one component referenced by the first output page markup language data; and
   updating the first output page markup language data based on the editing of the at least one component.

2. The method of claim 1, further comprising:
   reading string markup language data, the string markup language data defining transforms for a set of text strings; and
   translating one or more strings in the page markup language data according to the string markup language data.

3. The method of claim 2, further comprising translating one or more strings in the component markup language data according to the string markup language data.

4. The method of claim 1, further comprising:
   reading a library of page markup language templates; and
   translating the first output page markup language data to second output page markup language data using the library of page markup language templates.

5. The method of claim 4, further comprising:
   reading a set of dynamic content data; and
   inserting the dynamic content data into an output page according to the second page markup language data.

6. The method of claim 5, wherein the set of dynamic content data is transformed into a format described by a set of one or more result markup language files.

7. The method of claim 1, wherein the page markup language conforms to an XML schema.

8. A system for creating an output page, the system comprising:
   a processor;
   a machine-readable medium with instructions stored thereon, wherein the processor is operable to execute the instructions to configure:
   a markup language editor to receive page markup language data and to validate the page markup language data according to a schema for the page markup language;
   the markup language editor operable to receive a selection of one or more available components defined using component markup language, the available components including pre-defined layouts of an output page and at least one component of the one or more available components referenced by a plurality of output pages;
   a markup language translator to receive the page markup language data, replace calls to components with page markup language data, and to translate the page markup language data to first output markup language data and when the at least one component is changed, updating the plurality of output pages with the change made to the at least one component; and
   the translator operable to validate at least one component call in the page markup language data.

9. The system of claim 8, further comprising:
   a localization component to read string markup language data, the string markup language data defining internationalization transforms for a set of text strings and to translate one or more strings in the page markup language data according to the string markup language data.

10. The system of claim 9, wherein the localization component is operable to translate one or more strings in the component markup language data according to the string markup language data.

11. The system of claim 8, further comprising a first translator to read a library of page markup language transforms and translate the first output page markup language data to second output page markup language data using the library of page markup language transforms.

12. The system of claim 11, further comprising:
a second translator to read a set of dynamic content data and insert the dynamic content into an output page according to the second page markup language data.

13. The system of claim 12, wherein the output page comprises an HTML page.

14. The system of claim 12, wherein the output page comprises an electronic mail message.

15. The system of claim 12, wherein the set of dynamic content data is transformed into a format described by a set of one or more result markup language files.

16. The system of claim 8, wherein the schema comprises an XML schema.

17. The system of claim 8, wherein the component markup language conforms to an XML schema.

18. The system of claim 9, wherein the string markup language conforms to an XML schema.

19. The system of claim 13, wherein the results markup language schema comprises an XML schema.

20. A machine-readable medium having executable instructions for performing a method for authoring an output page, the method comprising:
reading page markup language data;
validating the page markup language data according to a schema for the page markup language;
presenting one or more available components defined using component markup language, the available components including pre-defined layouts of an output page in page markup language processing parameters associated with an available component in the page markup language data; and
translating the page markup language data to first output page markup language data;
editing at least one component of the one or more available components, the at least one component referenced by the first output page markup language data; and
updating the first output page markup language data based on the editing of the at least one component.

21. The machine-readable medium of claim 20, wherein the method further comprises:
reading string markup language data, the string markup language data defining transforms for a set of text strings; and
translating one or more strings in the page markup language data according to the string markup language data.

22. The machine-readable medium of claim 20, wherein the method further comprises translating one or more strings in the component markup language data according to the string markup language data.

23. The machine-readable medium of claim 20, wherein the method further comprises:
reading a library of page markup language templates; and
translating the first output page markup language data to second output page markup language data using the library of page markup language templates.

24. The machine-readable medium of claim 23, wherein the method further comprises:
reading a set of dynamic content data; and
inserting the dynamic content into an output page according to the second page markup language data.

25. The machine-readable medium of claim 24, wherein the set of dynamic content data is transformed into a format described by a set of one or more result markup language files.

26. The machine-readable medium of claim 20, wherein the page markup language conforms to an XML schema.

27. A method for authoring an output page, the method comprising:
creating page markup language data using a markup language editor;
reading the page markup language data;
validating the page markup language data according to a schema for the page markup language;
presenting one or more available components defined using component markup language, the available components including pre-defined layouts of an output page;
validating an available component in the page markup language data;
processing parameters associated with the available component in the page markup language data;
translating the page markup language to first output markup language data using a first translator;
reading a library of page markup language transforms using a second translator; wherein the page markup language transforms define translations of the first output markup language data;
translating the first output markup language data using the second translator and the page markup language translations to a second output page markup language data;
reading a set of dynamic content data and inserting the dynamic content data into the second output page markup language data;
reading a library of dynamic page markup language transforms using a third translator;
wherein the library of dynamic page markup language transforms define translations of the second output page markup language data; and
translating the second output page markup language data using the third translator and the library of dynamic page markup language translations into an output page;
editing at least one component of the one or more available components, the at least one component referenced by the output page; and
updating the output page based on the editing of the at least one component.

* * * * *